US012552974B2

(12) United States Patent
Leone et al.

(10) Patent No.: US 12,552,974 B2
(45) Date of Patent: *Feb. 17, 2026

(54) METHOD OF DISPOSING AN ADHESIVE ONTO A SUBSTRATE AND ARTICLE

(71) Applicant: 3M INNOVATIVE PROPERTIES COMPANY, St. Paul, MN (US)

(72) Inventors: Amanda K. Leone, St. Paul, MN (US); William H. Moser, Edina, MN (US); Michael A. Kropp, Cottage Grove, MN (US); Erik M. Townsend, South St. Paul, MN (US); Zachary J. Thompson, Woodbury, MN (US); Mary M. Caruso Dailey, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 835 days.

This patent is subject to a terminal disclaimer.

(21) Appl. No.: 17/626,944

(22) PCT Filed: Jul. 16, 2020

(86) PCT No.: PCT/IB2020/056698
§ 371 (c)(1),
(2) Date: Jan. 13, 2022

(87) PCT Pub. No.: WO2021/019353
PCT Pub. Date: Feb. 4, 2021

(65) Prior Publication Data
US 2022/0259469 A1    Aug. 18, 2022

Related U.S. Application Data

(60) Provisional application No. 62/878,940, filed on Jul. 26, 2019.

(51) Int. Cl.
*C09J 133/08* (2006.01)
(52) U.S. Cl.
CPC .................................. *C09J 133/08* (2013.01)
(58) Field of Classification Search
None
See application file for complete search history.

(56) References Cited

U.S. PATENT DOCUMENTS 2,801,185 A    7/1957    Iler
4,503,169 A    3/1985    Randklev
(Continued)

FOREIGN PATENT DOCUMENTS

CN    108348403 A    7/2018
WO    2007140440 A2    12/2007
(Continued)

OTHER PUBLICATIONS

Aguirre-Soto, "Visible-light organic photocatalysis for latent radical-initiated polymerization via 2e/1H transfers: Initiation with parallels to photosynthesis", J. Am. Chem.Soc, 2014, vol. 136, pp. 7418-7427.
(Continued)

*Primary Examiner* — Sanza L. Mcclendon

(57) ABSTRACT

A method of disposing an adhesive composition onto a first surface of a first substrate comprises: a) disposing a photoactivatable adhesive precursor composition onto at least a portion of the first surface of the first substrate according to a predetermined pattern, and b) exposing the photoactivatable adhesive precursor composition to actinic electromagnetic radiation, thereby providing an adhesive precursor composition that spontaneously cures to provide the adhesive composition. The photoactivatable adhesive precursor composition comprises: at least one free-radically polymerizable compound and a photoactivatable redox initiation
(Continued)

system comprising: (i) at least one photoactivatable reducing agent precursor; (ii) at least one transition metal compound comprising at least one metal selected from groups 5 to 11 in the Periodic Table of the Elements; (iii) optional organic peroxide; and (iv) optional quaternary ammonium halide. An article preparable according to the method is also disclosed.

16 Claims, 1 Drawing Sheet

(56) References Cited

U.S. PATENT DOCUMENTS

| | | | |
|---|---|---|---|
| 4,522,958 | A | 6/1985 | Das |
| 5,252,694 | A | 10/1993 | Willett |
| 5,721,289 | A | 2/1998 | Karim |
| 6,586,483 | B2 | 7/2003 | Kolb |
| 7,090,721 | B2 | 8/2006 | Craig |
| 7,090,722 | B2 | 8/2006 | Budd |
| 7,156,911 | B2 | 1/2007 | Kangas |
| 7,649,029 | B2 | 1/2010 | Kolb |
| 9,957,408 | B2 | 5/2018 | Thompson |
| 10,676,655 | B2 | 6/2020 | Shafer |
| 11,370,940 | B2 * | 6/2022 | Townsend .................. C09J 7/40 |
| 11,897,977 | B2 * | 2/2024 | Moser .................. C07D 405/12 |
| 2017/0190937 | A1 * | 7/2017 | Thompson ............... C09J 11/04 |
| 2018/0127625 | A1 | 5/2018 | Shafer |
| 2018/0312613 | A1 * | 11/2018 | Townsend ........... C08F 22/1006 |
| 2021/0387702 | A1 * | 12/2021 | Allen ...................... B63B 39/02 |

FOREIGN PATENT DOCUMENTS

| | | |
|---|---|---|
| WO | WO 2012-146914 | 11/2012 |
| WO | WO 2013-055944 | 4/2013 |
| WO | WO 2013-151739 | 10/2013 |
| WO | WO 2014-025716 | 2/2014 |
| WO | WO 2014-151650 | 9/2014 |
| WO | WO 2014-172185 | 10/2014 |
| WO | WO 2015-200007 | 12/2015 |
| WO | WO 2016-014218 | 1/2016 |
| WO | WO 2016-044151 | 3/2016 |
| WO | 2016/053877 A1 | 4/2016 |
| WO | WO 2016-053877 | 4/2016 |
| WO | WO 2017-095704 | 6/2017 |
| WO | WO 2018-215889 | 11/2018 |
| WO | WO 2019-152187 | 8/2019 |
| WO | WO 2019-152267 | 8/2019 |
| WO | WO 2022-003498 | 1/2022 |

OTHER PUBLICATIONS

Fors, "Control of a living radical polymerization of methacrylates by light", Angew. Chem. Int. Ed., 2012, vol. 51, pp. 8850-8853.

IUPAC Periodic table of the elements, 2018, International Union of Pure and Applied Chemistry, 1 page.

Klan, "Photoremovable protecting groups in chemistry and biology: reaction mechnaisms and efficacy", Chem. Rev., 2013, vol. 113, pp. 119-191.

Matyajaszewski, "Atom transfer radical polymerization", *Chemical Reviews*, 2001, vol. 101, pp. 2921-2990.

Pelliccioli, "Photoremovable protecting hroups: reaction mechanisms and applications", Photochem, Photobiol. Sci., 2002, vol. 01, pp. 441-458.

Peukert, "The pivaloylycol anchor group: A new platform for a photolabile linker in solid-phase synthesis", J. Org. Chem., 1998, vol. 63, pp. 9045-9051.

Xu, "A robust and versatile photoinduced living polymerization of conjugated and unconjugated monomers and its oxygen tolerance", J. Am. Chem. Soc., 2014. vol. 136, pp. 5508-5519.

International Search report for PCT International Application No. PCT/IB2020/056698 mailed on Sep. 23, 2020, 5 pages.

* cited by examiner

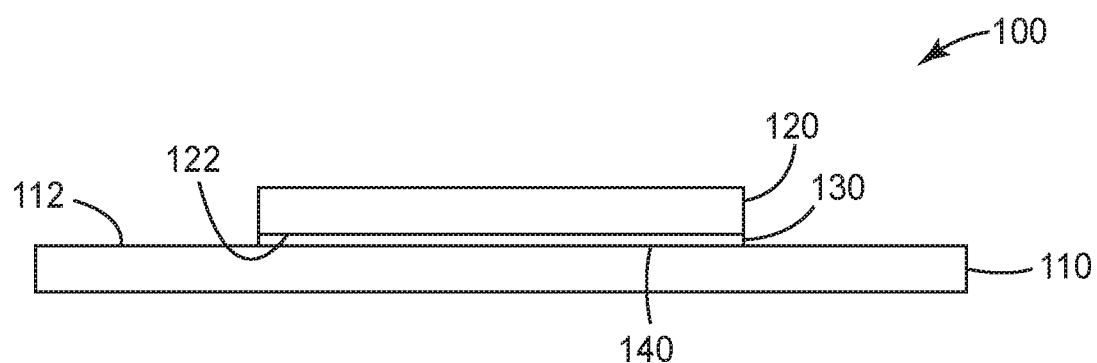

METHOD OF DISPOSING AN ADHESIVE ONTO A SUBSTRATE AND ARTICLE

CROSS-REFERENCE TO RELATED APPLICATIONS

This application is a national stage filing under 35 U.S.C. 371 of PCT/IB2020/056698, filed Jul. 16, 2020, which claims the benefit of Provisional Application No. 62/878,940, filed Jul. 26, 2019, the disclosure of which is incorporated by reference in its entirety herein.

TECHNICAL FIELD

The present disclosure broadly relates to adhesive compositions, methods of making and using them, and electronic devices including them.

BACKGROUND

Stencil printing and screen printing of curable adhesive precursor compositions are common techniques for precisely depositing adhesive compositions on a substrate with high resolution and consistent placement of adhesive bond lines. To avoid premature curing of the curable adhesive precursor compositions on the screen or stencil during printing, the curable adhesive precursor compositions must have a sufficient latent time. While photoactivatable adhesive precursor compositions can provide sufficient latent times, their scope of bonding substrates is restricted to transparent materials because traditional photoinitiators spur rapid curing after the application of light and do not allow for open time.

Redox-cured adhesives enable bonding non-transparent materials, which are particularly useful for permanent bonding between opaque substrates. A significant challenge with redox-initiated adhesives is their rapid cure from traditional two-part systems, such that upon mixing their final bond strength is quickly reached. This reduced latent time of redox-curing adhesive precursor compositions limits their utility in stencil/screen printing applications.

SUMMARY

The present disclosure overcomes the reduced latent time of redox-curing adhesive precursor compositions by using a photoactivable reducing agent that is activated upon exposure to actinic electromagnetic radiation. During activation a photoremovable group is removed from the photoactivatable reducing agent thereby generating the reducing agent which initiates the curing process. Absent actinic radiation, the photoactivatable adhesive precursor composition has good shelf stability. In some preferred embodiments, the actinic electromagnetic radiation comprises ultraviolet light. In such embodiments, the photoactivatable adhesive precursor composition can typically be handled in indoor ambient light without premature curing to form the adhesive composition.

In a first aspect, the present disclosure provides a method of disposing an adhesive composition onto a first surface of a first substrate, the method comprising steps:
a) disposing a photoactivatable adhesive precursor composition onto at least a portion of the first surface of the first substrate according to a predetermined pattern, wherein the photoactivatable adhesive precursor composition comprises:
at least one free-radically polymerizable compound; and
a photoactivatable redox initiation system comprising:
(i) at least one photoactivatable reducing agent precursor;
(ii) at least one transition metal compound comprising at least one metal selected from groups 5 to 11 in the Periodic Table of the Elements;
(iii) optional organic peroxide; and
(iv) optional quaternary ammonium halide; and
b) exposing the photoactivatable adhesive precursor composition to actinic electromagnetic radiation, thereby providing an adhesive precursor composition that spontaneously cures to provide the adhesive composition.

In a second aspect, the present disclosure provides an article comprising:
a first surface of a first substrate adhered to a second surface of a second substrate by an adhesive layer having a predetermined pattern that contacts less than the entire first surface, wherein the adhesive layer comprises an adhesive composition preparable by exposing a photoactivatable adhesive precursor composition to actinic electromagnetic radiation, thereby providing an adhesive precursor composition that spontaneously cures to provide the adhesive composition, and wherein the photoactivatable adhesive precursor composition comprises:
at least one free-radically polymerizable compound; and
a photoactivatable redox initiation system comprising:
(i) at least one photoactivatable reducing agent precursor;
(ii) at least one transition metal compound comprising at least one metal selected from groups 5 to 11 in the Periodic Table of the Elements;
(iii) optional organic peroxide; and
(iv) optional quaternary ammonium halide.

As used herein:
"actinic electromagnetic radiation" refers to electromagnetic radiation that is absorbed by a compound or composition thereby causing a photochemical reaction;
"(meth)acryl" refers to acryl and/or methacryl;
"photoactivatable" means have a group that is removable by exposure to actinic electromagnetic radiation; and
"Periodic Table of the Elements" refers to the Periodic Table of the Elements dated Dec. 1, 2018 which has 18 groups (i.e., columns) with lanthanides and actinides being classified under group 3.

Features and advantages of the present disclosure will be further understood upon consideration of the detailed description as well as the appended claims.

BRIEF DESCRIPTION OF THE DRAWINGS

FIG. 1 is a schematic side view of an exemplary article 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

The adhesive composition can be disposed onto a first surface of a first substrate by a method comprising at least two steps. In the first step, a photoactivatable adhesive precursor composition onto at least a portion of the first surface of the first substrate according to a predetermined pattern. In the second step the photoactivatable adhesive precursor composition is exposed to actinic electromagnetic radiation, thereby providing an adhesive precursor composition that subsequently cures to provide the adhesive composition.

The photoactivatable adhesive precursor composition comprises at least one free-radically polymerizable compound. The amount of free-radically polymerizable compound(s) in the photoactivatable adhesive precursor composition may comprise from 5 to 95 percent by weight, preferably 20 to 90 percent by weight, more preferably 30 to 85 percent by weight, based on the total weight of the photoactivatable adhesive precursor composition; however, this is not a requirement.

Useful free-radically polymerizable compounds (e.g., monomers and/or oligomers) may include compounds having 1, 2, 3, 4, or more free-radically polymerizable carbon-carbon double bonds. Examples include (meth)acrylate esters, (meth)acrylamides, vinyl esters (e.g., vinyl acetate and vinyl propionate), vinyl ethers (e.g., methyl vinyl ether, ethyl vinyl ether), styrenes (e.g., styrene, α-methyl-styrene, divinylstyrene); vinyl halides (e.g., vinyl chloride, dichloroethylene), alkenes (e.g., propylene, isomers of butylene, pentene, hexylene up to dodecene, isoprene, butadiene), N-vinyl isocyanurates, N-allyl isocyanurates, (meth)acrylonitrile, (meth)acrylic acid, alkoxylated versions thereof, oligomers thereof, and combinations thereof.

Exemplary (meth)acrylate ester compounds useful in preparing (meth)acrylate (co)polymers are (meth)acrylic esters of a non-tertiary alcohols, wherein the alcohol contains from 1 to 14 carbon atoms and preferably an average of from 4 to 12 carbon atoms.

Examples include esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctyl alcohol, 2-ethyl-1-hexanol, 1-decanol, 2-propylheptanol, 1-dodecanol, 1-tridecanol, 1-tetradecanol, citronellol, and dihydrocitronellol. In some embodiments, the (meth)acrylate ester is an ester of (meth)acrylic acid with butyl alcohol or isooctyl alcohol, or a combination thereof, although combinations of two or more different (meth)acrylate ester monomers are suitable. In some embodiments, the (meth)acrylate ester is an ester of (meth)acrylic acid with an alcohol derived from a renewable source, such as 2-octanol, citronellol, or dihydrocitronellol.

In some embodiments, it may desirable to include one or more high glass transition temperature ($T_g$) free-radically polymerizable compounds (i.e., monomers). The homopolymers of these high $T_g$ monomers have a $T_g$ of at least 25° C., and preferably at least 50° C. Examples of suitable monomers useful in the present disclosure include, but are not limited to, t-butyl acrylate, methyl methacrylate, ethyl methacrylate, isopropyl methacrylate, t-butyl methacrylate, phenyl methacrylate, cyclohexyl methacrylate, isobornyl acrylate, isobornyl methacrylate, benzyl methacrylate, 3,3,5-trimethylcyclohexyl acrylate, cyclohexyl acrylate, N-octyl acrylamide, and combinations thereof.

The free-radically polymerizable compound(s) may comprise an acid-functional monomer, where the acid functional group may be an acid per se, such as a carboxylic acid, or a portion may be a salt thereof, such as an alkali metal carboxylate. Useful acid functional monomers include, but are not limited to, those selected from ethylenically-unsaturated carboxylic acids, ethylenically-unsaturated sulfonic acids, ethylenically-unsaturated phosphonic or phosphoric acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrenesulfonic acid, 2-acrylamido-2-methylpropanesulfonic acid, vinylphosphonic acid, phosphate esters of polypropylene glycol monomethacrylate, and mixtures thereof.

Due to their availability, acid-functional monomers are typically selected from ethylenically-unsaturated carboxylic acids (e.g., (meth)acrylic acids). When stronger acids are desired, acidic monomers may include ethylenically-unsaturated sulfonic acids and ethylenically-unsaturated phosphonic acids. If present, acid-functional monomer is typically used in amounts of 0.5 to 15 parts by weight, preferably 1 to 15 parts by weight, most preferably 5 to 10 parts by weight, based on 100 parts by weight total monomer, although this is not a requirement.

The free-radically polymerizable compound(s) may comprise one or more non-acidic polar monomers. Examples of polar monomers include 2-hydroxyethyl (meth)acrylate; N-vinylpyrrolidone; N-vinylcaprolactam; acrylamide; mono- or di-N-alkyl-substituted acrylamide; t-butyl acrylamide; dimethylaminoethyl acrylamide; N-octyl acrylamide; tetrahydrofurfuryl (meth)acrylate; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, and polyethylene glycol mono(meth)acrylates; alkyl vinyl ethers, including vinyl methyl ether; and mixtures thereof. Preferred polar monomers include those selected from the group consisting of tetrahydrofurfuryl (meth)acrylate, 2-hydroxyethyl (meth)acrylate and N-vinylpyrrolidinone. If present, polar monomer(s) may be present in amounts of 0 to 10 parts by weight, preferably 0.5 to 5 parts by weight, based on 100 parts by weight of total monomer, although this is not a requirement.

Useful multifunctional (meth)acrylate monomers comprise three or more (meth)acrylate groups. Preferred multifunctional (meth)acrylate monomers comprising three or more (meth)acrylate groups include trimethylolpropane tri(meth)acrylate, pentaerythritol tri(meth)acrylate, pentaerythritol tetra(meth)acrylate, dipentaerythritol tri(meth)acrylate, dipentaerythritol penta(meth)acrylate, dipentaerythritol hydroxy penta(meth)acrylate, glyceryl-propoxy tri(meth)acrylate, trimethylolpropane tri(meth)acrylate, and combinations thereof. Multifunctional (meth)acrylate oligomers, having two or more (meth)acrylate groups, and having an average molecular weight ($M_W$) in the range from about 400 to 2000 grams/mole may also be used, for example.

Useful multifunctional (meth)acrylate oligomers include polyester (meth)acrylates, polyurethane (meth)acrylates, and epoxy (meth)acrylates. Epoxy (meth)acrylates and polyester (meth)acrylates are most preferred because they tend to have a relatively low viscosity and therefore allow a more uniform layer to be applied by the spin coating method. Specifically, preferred multifunctional (meth)acrylate oligomers include those commercially available from Allnex of Frankfurt, Germany under the trade designation "EBE-CRYL" (Eb). Examples include Eb40 (tetrafunctional acrylated polyester oligomer), Eb81 (multifunctional (meth) acrylated polyester oligomer), Eb600 (bisphenol A epoxy di(meth)acrylate), Eb605 (bisphenol A epoxy di(meth)acrylate diluted with 25% tripropylene glycol di(meth)acrylate), Eb639 (novolac polyester oligomer), Eb2047 (trifunctional acrylated polyester oligomer), Eb3500 (di-functional Bisphenol-A oligomer acrylate), Eb6602 (trifunctional aromatic urethane acrylate oligomer), Eb8301 (hexafunctional aliphatic urethane acrylate), and mixtures thereof. Of these, the most preferred are, Eb600, Eb605, and Eb81.

Useful free-radically polymerizable compounds may comprise one or more diluent monomers. The (meth)acrylate-functional diluents, also referred to herein as "reactive diluents", are relatively low molecular weight mono- or di-functional, non-aromatic, (meth)acrylic monomers. These relatively low molecular weight reactive diluents are advantageously of a relatively low viscosity, e.g., less than about 30 centipoise (cps) at 25° C. Difunctional non-aromatic (meth)acrylates may be preferred over mono-functional non-aromatic (meth)acrylates because di-functional non-aromatic (meth)acrylates allow for quicker cure time. Preferred reactive diluents include 1,6-hexanediol di(meth) acrylate, tripropylene glycol di(meth)acrylate, isobornyl (meth)acrylate, 2-(2-ethoxyethoxy)ethyl (meth)acrylate, N-vinyl formamide, tetrahydrofurfuryl (meth)acrylate, polyethylene glycol di(meth)acrylate, tripropylene glycol di(meth)acrylate, neopentyl glycol dialkoxy di(meth)acrylate, and combinations thereof.

The photoactivatable adhesive precursor composition further comprises a photoactivatable redox initiation system. The photoactivatable redox initiation system comprises: (i) at least one photoactivatable reducing agent precursor; (ii) at least one transition metal compound comprising at least one metal selected from groups 5 to 11 in the Periodic Table of the Elements.

Useful photoactivatable reducing agent precursor include photoactivatable derivatives of ascorbates, barbiturates, other 1,3-dicarbonyl compounds (e.g., as described in U.S. Pat. No. 9,957,408 (Thompson et al.) and in U.S. Pat. Appln. Publ. No. 2017/0190937 (Thompson et al.) and 2018/0312613 (Townsend et al.)).

In some embodiments, the at least one photoactivatable reducing agent precursor comprises at least one compound represented by the formula:

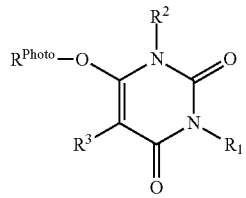

wherein each $R^1$, $R^2$, and $R^3$ independently represents H or a hydrocarbyl group having from 1 to 18 carbon atoms; and $R^{Photo}$ represents a photoremovable group. In these embodiments, loss of $R^{Photo}$ may result in formation of the corresponding barbituric acid:

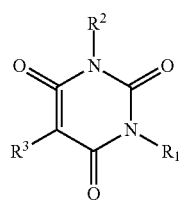

Examples of hydrocarbyl groups having from 1 to 18 carbon atoms include methyl, ethyl, propyl, butyl, pentyl, hexyl, phenyl, heptyl, octyl, nonyl, decyl, undecyl, dodecyl, hexadecyl, and octadecyl.

Exemplary photoremovable groups $R^{Photo}$ include phenacyl groups, 2-alkylphenacyl groups, ethylene-bridged phenacyl groups, o- or p-hydroxyphenacyl groups, benzoin-derived groups (e.g., 1,2-di(phenyl)ethanone-2-yl), o-nitrobenzyl groups, o-nitro-2-phenethyloxycarbonyl groups, coumarin-4-yl methyl groups, benzyl groups, o-hydroxylbenzyl groups, o-hydroxynapthyl groups, 2,5-dihydroxylbenzyl groups, 9-phenylthioxanthyl, 9-phenylxanthyl groups, anthraquinon-2-yl groups, 8-halo-7-hydroxyquinoline-2-yl methyl groups, pivaloylglycol-derived groups, and substituted versions thereof. Of these, o-nitrobenzyl may be preferred in some embodiments.

Methods of functionalizing compounds having active hydrogens (e.g., hydroxyl groups) with photoremovable groups $R^{Photo}$ are known in the art and are described, for example, in Petr Klan et al., Photoremovable Protecting Groups in Chemistry and Biology: Reaction Mechanisms and Efficiency; *Chemical Reviews* (2013), Vol. 113, pp. 119-191 and A. Pelliccioli et al., Photoremovable Protecting Groups: Reaction Mechanisms and Applications, *Photochemical and Photobiological Sciences* (2002), Vol. 1, pp. 441-458, and references contained therein.

In some embodiments, the at least one photoactivatable reducing agent precursor comprises at least one compound represented by the formulas:

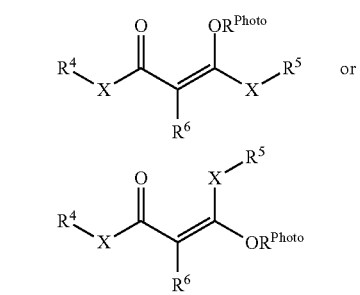

wherein each X independently represents a direct bond, —O—, —S—, —N($R^7$)—, —[C($R^7$)$_2$]$_y$—, —(C=O)—, or —(C=O)O—; each of $R^4$, $R^5$, $R^6$, and $R^7$ independently represents hydrogen or an optionally substituted alkyl group having 1 to 18 carbon atoms (e.g., methyl, ethyl, methoxyethyl, propyl, methoxypropyl, butyl, pentyl, hexyl, heptyl, octyl, nonyl, decyl, undecyl, dodecyl, hexadecyl, and octadecyl), except that any two of $R^4$, $R^5$, and $R^6$ may together form a divalent connecting group (e.g., methylene, ethylene, 1,3-propylene, 1,4-butylene) that forms a 5- or 6-membered ring; y is 1, 2, or 3; and $R^{Photo}$ is a photoremovable group as described above. In these embodiments, loss of $R^{Photo}$ may result in formation of the corresponding 1,3-diketone:

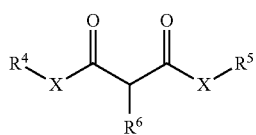

Exemplary photoactivatable reducing agent precursors include:

2-nitrobenzyl-blocked 1,3-cyclopentanedione:

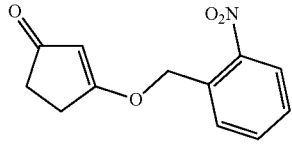 [SMILES: O=C1C=C(OCc2ccccc2[N+](=O)[O-])CC1]

3,4-dimethoxy-2-nitrobenzyl-blocked 2-methyl-1,3-cyclopentanedione:

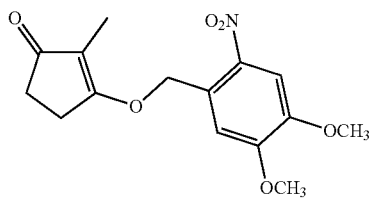 [SMILES: COc1cc(COC2=C(C)C(=O)CC2)c([N+](=O)[O-])cc1OC]

2-nitrobenzyl-blocked 2-methyl-1,3-cyclohexanedione:

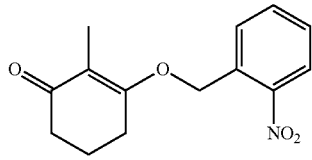 [SMILES: CC1=C(OCc2ccccc2[N+](=O)[O-])CCCC1=O]

2-nitrobenzyl-blocked 1,3-cyclohexanedione:

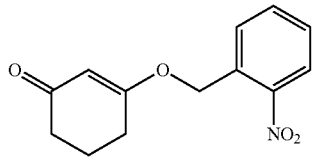 [SMILES: O=C1C=C(OCc2ccccc2[N+](=O)[O-])CCC1]

2-nitrobenzyl-blocked dimedone:

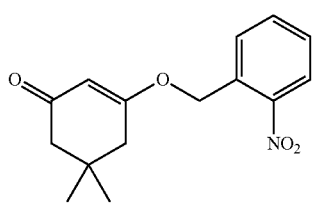 [SMILES: CC1(C)CC(=O)C=C(OCc2ccccc2[N+](=O)[O-])C1]

a mixture of 2-nitrobenzyl-blocked β-ketoesters:

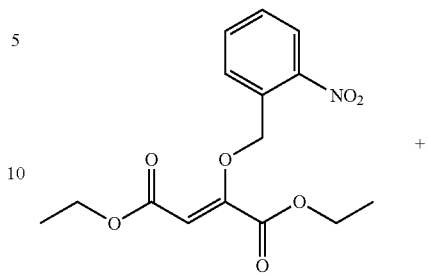

+

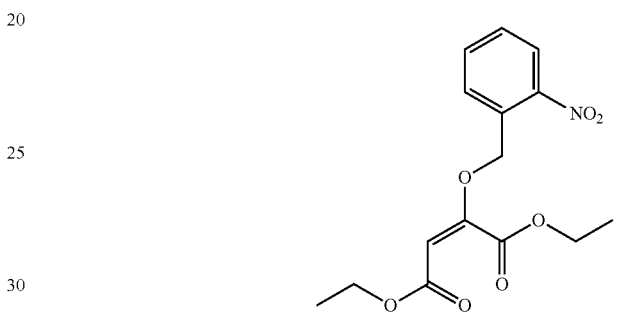

a mixture of 2-nitrobenzyl-blocked 3-ethyl-2,4-pentanediones:

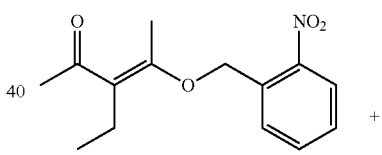

+

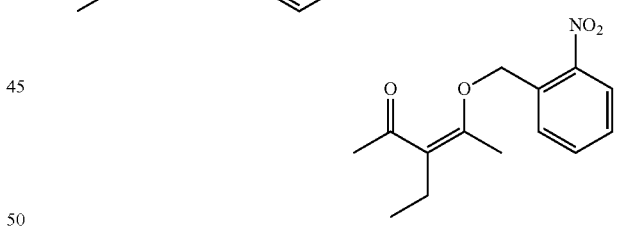

2-nitrobenzyl blocked 1,3-dimethyl barbituric acid:

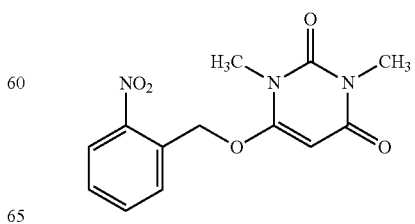

and 2-nitrobenzyl-blocked 5-benzyl-1,3-dimethylbarbituric acid:

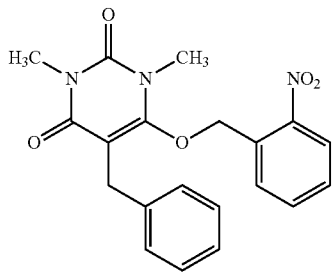 [SMILES: Cn1c(OCc2ccccc2[N+](=O)[O-])c(Cc2ccccc2)c(=O)n(C)c1=O]

Upon photoactivation of the photoactivatable redox initiator system, the transition metal compound(s) participate in a redox cycle with the other components of the resultant redox initiator system.

Useful transition metal compounds include transition metal oxides (e.g., copper oxide) and transition metal complexes that comprise at least one metal (e.g., as a metal cation) selected from groups 5 to 11 in the Periodic Table of the Elements. Exemplary metals include copper, iron, ruthenium, chromium, molybdenum, palladium, nickel, platinum, manganese, rhodium, rhenium, cobalt, vanadium, gold, niobium, and silver. The metal may be in a catalytically active state or converted to one in situ, for example. Preferred low-valence metal ions include Cu(II), Fe(II), Ru(II) and Co(II). Other valences of these same metals may be used.

In addition, compounds of these metals can be also be used and/or combined with the foregoing metals mixed with one or more other metallic components such as lead, cerium, calcium, barium, zinc and/or zirconium. The choice of metal may have a rate-determining effect on initiation of polymerization because of a temperature dependence of the metal component in the process. Iron, cobalt, copper, manganese and vanadium are typically highly active at room temperature.

Exemplary useful transition metal compounds may be represented by the general formula

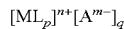

wherein M is a transition metal selected from groups 5 to 11 in the Periodic Table of the Elements that participates in a redox cycle, L is a ligand, $A^{m-}$ is an anion having a negative charge of m−; m and n are independently integers from 1 to 7, preferably 1 to 3; p is an integer from 1 to 9, preferably 1 to 2; and q is a whole number selected such that m·q=n.

Useful anions, $A^{m-}$, include halides (e.g., fluoride, chloride, bromide, or iodide), $C_1$-$C_6$ alkoxy groups, nitrate, sulfate, phosphate, hydrogen phosphate (i.e., $HPO_4^{2-}$), hexafluoroantimonate, pentafluorohydroxyantimonate, triflate, hexafluorophosphate, methanesulfonate, arylsulfonate, cyanide, $C_1$-$C_{12}$ alkyl carboxylates, and $C_6$-$C_{18}$ aryl carboxylates.

The ligand, L, is used to solubilize the transition metal compounds in a suitable solvent and adjust the redox potential of the transition metal for appropriate reactivity and selectivity. The ligands can direct the metal complex to undergo the desired one-electron atom transfer process, rather than a two-electron process such as oxidative addition/reductive elimination. The ligands may further enhance the stability of the complexes in the presence of different monomers and solvents or at different temperatures. Acidic monomers and monomers that strongly complex transition metals may still be efficiently polymerized by appropriate selection of ligands.

Useful ligands include those having one or more nitrogen, oxygen, phosphorus and/or sulfur atoms which can coordinate to the transition metal through a σ-bond, ligands containing two or more carbon atoms which can coordinate to the transition metal through a π-bond, and ligands which can coordinate to the transition metal through a μ-bond or an η-bond.

Useful ligands include those having one or more nitrogen, oxygen, phosphorus and/or sulfur atoms which can coordinate to the transition metal through a 6-bond are provided by monodentate and polydentate compounds preferably containing up to about 30 carbon atoms and up to 10 heteroatoms selected from aluminum, boron, nitrogen, sulfur, non-peroxidic oxygen, phosphorus, arsenic, selenium, antimony, and tellurium, where upon addition to the metal atom, following loss of zero, one, or two hydrogens, the polydentate compounds preferably forming with the metal, $M^{n+}$, a 4-, 5-, or 6-membered saturated or unsaturated ring. Examples of suitable monodentate compounds or groups are carbon monoxide, alcohols such as ethanol, butanol, and phenol; pyridine; nitrosonium (i.e., $NO^+$); compounds of Group 15 elements such as ammonia, phosphine, trimethylamine, trimethylphosphine, tributylphosphine, triphenylamine, triphenylphosphine, or triphenylarsine); tributylphosphite; nitriles (e.g., acetonitrile, benzonitrile); isonitriles (e.g., phenylisonitrile, butylisonitrile); carbenes (e.g., ethoxymethylcarbene, dithiomethoxycarbene, methylidene, and ethylidene).

Suitable polydentate compounds or groups include dipyridyl; 1,2-bis(diphenylphosphino)ethane; 1,2-bis(diphenylarsino)ethane; bis(diphenylphosphino)methane; polyamines (e.g., ethylenediamine, propylenediamine, tetramethyl ethylene diamine, hexamethyl tris-aminoethylamine, diethylenetriamine, and hydridotripyrazolylborate); the hydroxycarboxylic acids (e.g., glycolic acid, lactic acid, or salicylic acid); polyhydric phenols (e.g., catechol and 2,2'-dihydroxybiphenyl); hydroxyamines (e.g., ethanolamine, propanolamine, or 2-aminophenol); dithiocarbamates (e.g., diethyldithiocarbamate, dibenzyldithiocarbamate); xanthates (e.g., ethyl xanthate, phenyl xanthate); dithiolenes (e.g., bis(perfluoromethyl)-1,2-dithiolene); aminocarboxylic acids (e.g., alanine, glycine, and o-aminobenzoic acid); dicarboxylic diamines (e.g., oxalamide); biuret; diketones (e.g., 2,4-pentanedione); hydroxyketones (e.g., 2-hydroxyacetophenone); alpha-hydroxyoximes (e.g., salicylaldoxime); ketoximes (e.g., benzil oxime); 1,10-phenanthroline; porphyrin; cryptands; crown ethers (e.g., 18-crown-6 ether); and glyoximes (e.g., dimethylglyoxime).

Other suitable ligands that can coordinate to the transition metal through a 6-bond are the inorganic groups such as, for example, F, OH, Cl, Br, I, and H and the organic groups such as, for example, CN, SCN, acetoxy, formyloxy, and benzoyloxy. The ligand can also be a unit of a polymer; for example the amino group in poly(ethylenamine); the phosphino group in poly(4-vinylphenyldiphenyl-phosphine); the carboxylic acid group in poly(acrylic acid); and the isonitrile group in poly(4-vinyl-phenylisonitrile).

Useful ligands containing two or more carbon atoms which can coordinate to the transition metal through a π-bond are provided by any monomeric or polymeric compound having an accessible unsaturated group, i.e., an ethylenic, —C═C— group; acetylenic, —C≡C— group; or aromatic group which has accessible π-electrons regardless of the total molecular weight of the compound.

Illustrative of π-bond ligands are the linear and cyclic ethylenic and acetylenic compounds having less than 100 carbon atoms (when monomeric), preferably having less than 60 carbon atoms, and from zero to 10 heteroatoms selected from nitrogen, sulfur, non-peroxidic oxygen, phosphorous, arsenic, selenium, boron, aluminum, antimony, tellurium, silicon, germanium, and tin, the ligands being those such as ethylene, acetylene, propylene, methylacetylene, α-butene, 2-butene, diacetylene, butadiene, 1,2-dimethylacetylene, cyclobutene, pentene, cyclopentene, hexene, cyclohexene, 1,3-cyclohexadiene, cyclopentadiene, 1,4-cyclohexadiene, cycloheptene, 1-octene, 4-octene, 3,4-dimethyl-3-hexene, and 1-decene; $\eta^3$-allyl, $\eta^3$-pentenyl, norbornadiene, $\eta^5$-cyclohexadienyl, cycloheptatriene, cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, aluminum, antimony, tellurium, silicon, germanium, and tin, such as, for example, $\eta^5$-cyclopentadienyl, benzene, mesitylene, toluene, xylene, tetramethylbenzene, hexamethylbenzene, fluorene, naphthalene, anthracene, chrysene, pyrene, $\eta^7$-cycloheptatrienyl, triphenylmethane, paracyclophane, 1,4-diphenylbutane, $\eta^5$-pyrrole, $\eta^5$-thiophene, $\eta^5$-furan, pyridine, gamma-picoline, quinaldine, benzopyran, thiochrome, benzoxazine, indole, acridine, carbazole, triphenylene, silabenzene, arsabenzene, stibabenzene, 2,4,6-triphenylphosphabenzene, $\eta^5$-selenophene, dibenzostannepine, $\eta^5$-tellurophene, phenothiazine, selenanthrene, phenoxaphosphine, phenarsazine, phenatellurazine, $\eta^5$-methylcyclopentadienyl, $\eta^5$-pentamethylcyclopentadienyl, and 1-phenylborabenzene. Other suitable aromatic compounds can be found by consulting any of many chemical handbooks.

Additional ligands include unsubstituted and substituted naphthenates, unsubstituted and substituted pyridines and bipyridines, tertiary amines, including polydentate amines such as tetramethyl ethylenediamine and hexamethyl trisaminoethylamine, acetonitrile, phosphites such as $(CH_3O)_3$P, 1,10-phenanthroline, porphyrin, cryptands and crown ethers, such as 18-crown-6. Useful ligands and ligand-metal complexes useful in the initiator systems of the present disclosure are described in Matyjaszewski and Xia, *Chemical Reviews* (2001), vol. 101, pp. 2921-2990.

Suitable salts and oxides of polyvalent metals may include soluble ionic salts of the type generally used in oil drying technology. The metals should have several valency states and suitable metal salts are those of multivalent metals, especially transition metals. The metal ions are suitably present in their low valency state. The metal salt should be at least partially soluble in the composition, and may be present in the composition in an effective amount which is generally in a range of between about 1 and about 5000 parts per million (ppm), particularly about 1 to 3000 ppm, and more particularly about 500 to 3000 ppm. Metal naphthenates or metal acetylacetonates are generally soluble in the composition, but other salts or organometallics may be used if they are sufficiently soluble.

The molar proportion of photoactivatable reducing agent relative to transition metal compound is generally an amount that is effective to polymerize the selected polymerizable component(s), preferably from 1000:1 to 5:1, more preferably from 500:1 to 25:1, more preferably from 250:1 to 50:1, and even more preferably from 200:1 to 75:1. The oxidant and photoactivatable reducing agent of the redox initiator system are used in approximately equimolar amount. Generally, the mole ratio of the oxidant and photoactivatable reducing agent is from 1:1.5 to 1.5:1, preferably 1:1.1 to 1.1:1, although other amounts may also be used.

The reducing and oxidizing agents are present in amounts sufficient to permit an adequate free-radical reaction rate. This can be evaluated by combining all of the ingredients of the polymerizable composition except for the optional filler, and observing whether or not a hardened mass is obtained.

Preferably, the photoactivatable reducing agent is present in an amount of at least 0.01 part by weight, and more preferably at least 0.1 parts by weight, based on the total weight of the monomer components of the polymerizable composition. Preferably, the reducing agent is present in an amount of no greater than 10 parts by weight, and more preferably no greater than 5 parts by weight, based on the total weight of the polymerizable components of the polymerizable composition.

Preferably, the oxidizing agent (e.g., organic peroxide) is present in an amount of at least 0.0001 part by weight, and more preferably at least 0.001 part by weight, based on the total weight of the polymerizable components of the polymerizable composition, although this is not a requirement. Preferably, the oxidizing agent is present in an amount of no greater than 10 part by weight, and more preferably no greater than 5 parts by weight, based on the total weight of the polymerizable components of the polymerizable composition.

Optionally, but preferably, the photoactivatable adhesive precursor composition may further comprise one or more organic peroxides (e.g., mono- or multi-functional carboxylic acid peroxyesters). Commercially available organic peroxides include, for example, t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, dialkyl peroxydicarbonates, and O,O-t-alkyl O-alkyl diesters of monoperoxycarbonic acid. Exemplary organic peroxides include diisopropyl peroxydicarbonate, t-butyl peroxyneodecanoate, t-amyl peroxyneodecanoate, maleic acid t-butyl monoperoxyester, t-butyl peroxybenzoate, t-butyl peroxy-2-ethylhexanoate, t-amyl peroxy-2-ethylhexanoate, O-isopropyl O,O-t-butyl monoperoxycarbonate, dicyclohexyl peroxycarbonate, dimyristyl peroxycarbonate, dicetyl peroxycarbonate, di(2-ethylhexyl) peroxycarbonate, O,O-t-butyl O-2-ethylhexyl peroxycarbonate, t-butyl peroxy-3,5,5-trimethylhexanoate, t-amyl peroxybenzoate, t-butyl peroxyacetate, di(4-t-butylcyclohexyl) peroxycarbonate, cumyl peroxyneodecanoate, t-amyl peroxypivalate, and t-butyl peroxypivalate.

Typically, the organic peroxide (if present) is present in an effective amount to participate in initiating free-radical polymerization. Exemplary amounts may range from about 0.1 percent by weight up to about 1, 5 percent by weight, based on the total weight of the photoactivatable adhesive precursor composition.

In some embodiments, the photoactivatable adhesive precursor composition may contain little or no organic peroxide. For example, it may be essentially free of (e.g., contain less than 1 percent by weight of, less than 0.1 percent by weight of, or even contain less than 0.01 percent by weight of organic peroxide.

Suitable quaternary ammonium halides are preferably at least partially soluble in the photoactivatable adhesive precursor composition. Quaternary ammonium halides may accelerate the free-radical polymerization rate. Exemplary suitable quaternary ammonium halides include those having four hydrocarbyl (e.g., alkyl, alkenyl, cycloalkyl, aralkyl, alkaryl, and/or aryl) groups. Preferably, the hydrocarbyl groups are independently selected from hydrocarbyl groups having from 1 to 18 carbon atoms, more preferably 1 to 12 carbon atoms, and more preferably 1 to 4 carbon atoms. Examples of suitable hydrocarbyl groups include methyl, ethyl, propyl, butyl, hexyl, octyl, dodecyl, hexadecyl, and octadecyl, benzyl, phenyl, tolyl, cyclohexyl, and methylcyclohexyl. Exemplary suitable quaternary ammonium compounds include tetramethylammonium halides, tetraethylammonium halides, tetrapropylammonium halides, tetrabutylammonium halides, ethyltrimethylammonium halides, diethyldimethylammonium halides, trimethylbutylammonium halides, and benzyltributylammonium halides. Any halide (e.g., $F^-$, $Cl^-$, $Br^-$, $I^-$) may be used in the quaternary ammonium halide, but preferably the halide is chloride or bromide.

Total amounts of the non-metallic halide salt(s) may range from about 1 to 5000 parts per million (ppm), preferably from about 1 to 3000 ppm, and more preferably about 400 to 3000 ppm, based on the total weight of the photoactivatable adhesive precursor composition, although other amounts may also be used.

The photoactivatable adhesive precursor composition may also include other additives. Examples of suitable additives include tackifiers (e.g., rosin esters, terpenes, phenols, and aliphatic, aromatic, or mixtures of aliphatic and aromatic synthetic hydrocarbon resins), surfactants, plasticizers (other than physical blowing agents), nucleating agents (e.g., talc, silica, or $TiO_2$), pigments, dyes, reinforcing agents, solid fillers, stabilizers (e.g., UV stabilizers), Adjuvants may optionally be included in the adhesive precursor composition. Examples include colorants, anti-oxidant stabilizers, thermal degradation stabilizers, light stabilizers, conductive particles, tackifiers, flow agents, film-forming polymers, bodying agents, flatting agents, fillers, binders, blowing agents, tougheners, fungicides, bactericides, surfactants, plasticizers, and rubber tougheners, and combinations thereof. The additives may be added in amounts sufficient to obtain the desired properties for the cured composition being produced. The desired properties are largely dictated by the intended application of the resultant polymeric article.

In some embodiments the total amount of filler is at most 50 wt. %, preferably at most 30 wt. %, and more preferably at most 10 wt. % filler. Fillers may be selected from one or more of a wide variety of materials, as known in the art, and include organic and inorganic filler. Examples of inorganic filler particles include silica, submicron silica, zirconia, submicron zirconia, and non-vitreous microparticles of the type described in U.S. Pat. No. 4,503,169 (Randklev). Filler components may include nanosized silica particles, nanosized metal oxide particles, and combinations thereof. Nanofillers are also described in U.S. Pat. No. 7,090,721 (Craig et al.), U.S. Pat. No. 7,090,722 (Budd et al.), U.S. Pat. No. 7,156,911(Kangas et al.), and U.S. Pat. No. 7,649,029 (Kolb et al.).

In some embodiments the filler may be surface modified. A variety of conventional methods are available for modifying the surface of nanoparticles including, e.g., adding a surface-modifying agent to nanoparticles (e.g., in the form of a powder or a colloidal dispersion) and allowing the surface-modifying agent to react with the nanoparticles. Other useful surface-modification processes are described in, e.g., U.S. Pat. No. 2,801,185 (Iler), U.S. Pat. No. 4,522,958 (Das et al.), and U.S. Pat. No. 6,586,483 (Kolb et al.).

Exemplary toughening agents include polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell.

Useful toughening agents include core/shell polymers such as methacrylate-butadiene-styrene (MBS) copolymer wherein the core is crosslinked styrene/butadiene rubber and the shell is polymethyl acrylate, those having a core comprising polybutadiene and a shell comprising poly(methyl methacrylate) (e.g., CLEARSTRENGTH C223 available from Arkema, King of Prussia, Pennsylvania), those having a polysiloxane core and a polyacrylate shell (e.g., GENIOPERL P52 available from Wacker-Chemie GmbH, Wacker Silicones, Munich, Germany), those having a polyacrylate core and a poly(methyl methacrylate) shell (e.g., PARALOID EXL2330 available from Dow chemical, Midland, Michigan), those having an MBS core and a poly(methyl methacrylate) shell (e.g., PARALOID EXL2691, and EXL2655 available from Dow Chemical), and combinations thereof.

The photoactivatable adhesive precursor composition is activated by exposure to actinic electromagnetic radiation of wavelength suitable to deprotect the photoactivatable reducing agent precursor and provide the corresponding adhesive precursor composition. Any suitable actinic electromagnetic radiation may be used including, for example, ultraviolet and/or visible light. In order to be effective, the actinic electromagnetic radiation is preferably absorbed directly by the photoactivatable reducing agent precursor, although a photosensitizer (e.g., a sensitizing dye) may be used. Typically, sufficient dose and intensity of the actinic electromagnetic radiation is provided to effect curing of the adhesive precursor composition, although this is not a requirement. Selection of wavelengths, intensity and dosage is within the capabilities of those skilled in the art.

Exemplary sources of actinic electromagnetic radiation include mercury arc lamps (e.g., low-pressure, medium-pressure, or high-pressure), LED lights (e.g., at 365 nm, 385 nm, or 405 nm), continuous wave or pulsed lasers (ultraviolet or visible wavelength), xenon arc lamps, xenon flash lamps, carbon arc lamps, tungsten filament lamps, microwave-driven H-type, D-type, or V-type mercury lamp, such as of those commercially available from Fusion UV Systems, Gaithersburg, Maryland, and sunlight may be suitable. Filters and/or dichroic reflectors may also be useful, for example, to reduce thermal energy that accompanies the actinic radiation.

While typically the photoactivatable adhesive precursor composition is disposed on the surface of the substrate prior to, or simultaneously with, exposure to actinic electromagnetic radiation, it is also possible to expose the composition prior to disposing it on the surface of the substrate provided that curing is sufficiently slow that it can be effective disposed on the substrate.

Methods of disposing the (photoactivatable) adhesive precursor composition on the substrate should be capable of disposing the (photoactivatable) adhesive precursor composition according to a predetermined pattern (e.g., by a digital application method, stencil, or screen printing) and may include any known printing method such as, for example, piezo inkjet printing, valve jet printing, spray jet coating, hollow nozzle/needle dispensing, screen printing, flexographic printing, lithographic printing, and stencil printing. Of these, stencil printing and screen printing are presently preferred. In some cases it may be desirable to modify the viscosity (e.g., lower or higher) of the (photoactivatable) adhesive precursor composition in order for it to be suitable for the application method selected.

Once the adhesive precursor composition is prepared in many embodiments a second substrate of some type is contacted with it, forming an adhesive bond through subsequent curing.

Exemplary substrate materials for either of the first and/or second substrates include, metal, glass, plastic, ceramic, wood, composite materials, and combinations thereof. The (photoactivatable) adhesive precursor composition may be printed upon a variety of flexible and inflexible first and/or second substrates using conventional coating techniques to produce coated articles. Exemplary first and/or second substrates include printed circuit boards, flexible circuits, and display covers, electronic components (e.g., digital displays, integrated circuits), fiber optic couplers, electrical connectors, and plastic films such as polypropylene, polyethylene, polyvinyl chloride, polyester (e.g., polyethylene terephthalate), polycarbonate, polymethyl (meth)acrylate, cellulose acetate, cellulose triacetate, and ethyl cellulose films, and polymeric foam backings.

In some embodiments, the polymerizable composition provides a structural and semi-structural adhesive composition in which the partially cured composition may be disposed between two substrates (or adherends), and subsequently fully cured to create a structural or semi-structural bond between the substrates. "Semi-structural adhesives" are those cured adhesives that have an overlap shear strength of at least about 0.5 MPa, more preferably at least about 1.0 MPa, and most preferably at least about 1.5 MPa. Those cured adhesives having particularly high overlap shear strength, however, are referred to as structural adhesives. "Structural adhesives" are those cured adhesives that have an overlap shear strength of at least about 3.5 MPa, more preferably at least about 5 MPa, and most preferably at least about 7 MPa.

In some embodiments, the cured adhesive composition is a pressure-sensitive adhesive. In such cases, the second substrate may be contacted with the adhesive composition after curing is substantially completed.

Referring now to FIG. 1, exemplary electronic article 100 comprises a first surface 112 of a first substrate 110 adhered to a second surface 122 of a second substrate 120 by an adhesive layer 130 having a predetermined pattern 140 that contacts less than the entire first surface 112. Adhesive layer 130 comprises and adhesive composition preparable by exposing a photoactivatable adhesive precursor composition according to the present disclosure to actinic electromagnetic radiation.

Select Embodiments of the Present Disclosure

In a first aspect, the present disclosure provides a method of disposing an adhesive composition onto a first surface of a first substrate, the method comprising steps:
a) disposing a photoactivatable adhesive precursor composition onto at least a portion of the first surface of the first substrate according to a predetermined pattern, wherein the photoactivatable adhesive precursor composition comprises:
at least one free-radically polymerizable compound; and
a photoactivatable redox initiation system comprising:
(i) at least one photoactivatable reducing agent precursor;
(ii) at least one transition metal compound comprising at least one metal selected from groups 5 to 11 in the Periodic Table of the Elements;
(iii) optional organic peroxide; and
(iv) optional quaternary ammonium halide; and
b) exposing the photoactivatable adhesive precursor composition to actinic electromagnetic radiation, thereby providing an adhesive precursor composition that spontaneously cures to provide the adhesive composition.

In a second embodiment, the present disclosure provides a method according to the first embodiment, wherein the at least one metal selected from groups 5 to 11 in the Periodic Table of the Elements comprises at least one of copper, iron, ruthenium, chromium, molybdenum, palladium, nickel, platinum, manganese, rhodium, rhenium, cobalt, vanadium, gold, niobium, or silver.

In a third embodiment, the present disclosure provides a method according to the first or second embodiment, wherein the at least one free-radically polymerizable compound comprises at least one (meth)acrylic monomer or oligomer.

In a fourth embodiment, the present disclosure provides a method according to any of the first to third embodiments, wherein the at least one photoactivatable reducing agent precursor is represented by:

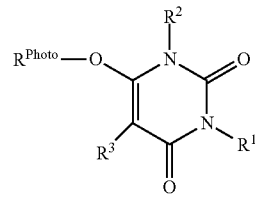

wherein
each $R^1$, $R^2$, and $R^3$ independently represents H or a hydrocarbyl group having from 1 to 18 carbon atoms; and
each $R^{Photo}$ independently represents a photoremovable group.

In a fifth embodiment, the present disclosure provides a method according to the fourth embodiment, wherein the photoremovable group is an o-nitrobenzyl group.

In a sixth embodiment, the present disclosure provides a method according to any of the first to third embodiments, wherein the at least one photoactivatable reducing agent precursor is represented by at least one of:

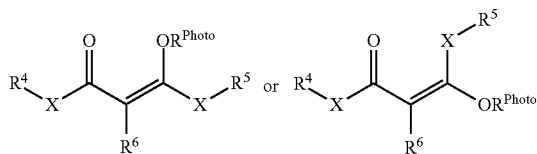

wherein
each X independently represents a direct bond, —O—, —S—, —N($R^7$)— —[C($R^7$)$_2$]$_y$—, —(C=O)—, or —(C=O)O—;
each of $R^4$ and $R^5$ independently represents hydrogen or an optionally substituted alkyl group having 1 to 18 carbon atoms; and
each of $R^6$ and $R^7$ independently represents hydrogen or an optionally substituted alkyl group having 1 to 18 carbon atoms,
except that any two of $R^4$, $R^5$, and $R^6$ may together form a divalent connecting group that forms a 5- or 6-membered ring;

y is 1, 2, or 3; and $R^{Photo}$ is a photoremovable group.

In a seventh embodiment, the present disclosure provides a method according to the sixth embodiment, wherein the photoremovable group is an o-nitrobenzyl group.

In an eighth embodiment, the present disclosure provides a method according to any of the first to seventh embodiments, wherein the optional organic peroxide is present.

In a ninth embodiment, the present disclosure provides a method according to any of the first to eighth embodiments, wherein the optional quaternary ammonium halide is present.

In a tenth embodiment, the present disclosure provides a method according to any of the first to ninth embodiments, wherein said disposing the photoactivatable adhesive precursor composition comprises screen printing or stencil printing the photoactivatable adhesive precursor composition.

In an eleventh embodiment, the present disclosure provides a method according to any of the first to tenth embodiments, further comprising contacting the adhesive precursor composition with at least a portion of a second surface of a second substrate prior to sufficient curing to provide the adhesive composition.

In a twelfth embodiment, the present disclosure provides an article comprising:

a first surface of a first substrate adhered to a second surface of a second substrate by an adhesive layer having a predetermined pattern that contacts less than the entire first surface, wherein the adhesive layer comprises an adhesive composition preparable by exposing a photoactivatable adhesive precursor composition to actinic electromagnetic radiation, thereby providing an adhesive precursor composition that spontaneously cures to provide the adhesive composition, and wherein the photoactivatable adhesive precursor composition comprises:

at least one free-radically polymerizable compound; and a photoactivatable redox initiation system comprising:

(i) at least one photoactivatable reducing agent precursor;

(ii) at least one transition metal compound comprising at least one metal selected from groups 5 to 11 in the Periodic Table of the Elements;

(iii) optional organic peroxide; and (iv) optional quaternary ammonium halide.

In a thirteenth embodiment, the present disclosure provides a method according to the twelfth embodiment, wherein the at least one metal selected from groups 5 to 11 in the Periodic Table of the Elements comprises at least one of copper, iron, ruthenium, chromium, molybdenum, palladium, nickel, platinum, manganese, rhodium, rhenium, cobalt, vanadium, gold, niobium, or silver.

In a fourteenth embodiment, the present disclosure provides a method according to the twelfth or thirteenth embodiment, wherein the at least one free-radically polymerizable compound comprises at least one (meth)acrylic monomer or oligomer.

In a fifteenth embodiment, the present disclosure provides a method according to any of the twelfth to fourteenth embodiments, wherein the at least one photoactivatable reducing agent precursor is represented by:

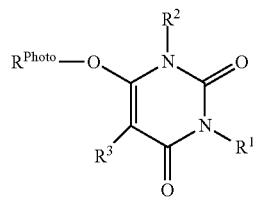

wherein each $R^1$, $R^2$, and $R^3$ independently represents H or a hydrocarbyl group having from 1 to 18 carbon atoms; and each $R^{Photo}$ independently represents a photoremovable group.

In a sixteenth embodiment, the present disclosure provides a method according to the fifteenth embodiment, wherein the photoremovable group is an o-nitrobenzyl group.

In a seventeenth embodiment, the present disclosure provides a method according to any of the twelfth to sixteenth embodiments, wherein the at least one photoactivatable reducing agent precursor is represented by at least one of:

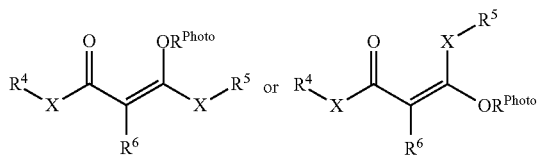

wherein each X independently represents a direct bond, —O—, —S—, —N($R^7$)— —[C($R^7$)$_2$]$_y$—, —(C=O)—, or —(C=O)O—;

each of $R^4$ and $R^5$ independently represents hydrogen or an optionally substituted alkyl group having 1 to 18 carbon atoms; and each of $R^6$ and $R^7$ independently represents hydrogen or an optionally substituted alkyl group having 1 to 18 carbon atoms, except that any two of $R^4$, $R^5$, and $R^6$ may together form a divalent connecting group that forms a 5- or 6-membered ring;

y is 1, 2, or 3; and $R^{Photo}$ is a photoremovable group.

In an eighteenth embodiment, the present disclosure provides a method according to the seventeenth embodiment, wherein the photoremovable group is an o-nitrobenzyl group.

In a nineteenth embodiment, the present disclosure provides a method according to any of the twelfth to eighteenth embodiments, wherein the optional organic peroxide is present.

In a twentieth embodiment, the present disclosure provides a method according to any of the twelfth to nineteenth embodiments, wherein the optional quaternary ammonium halide is present.

In a twenty-first embodiment, the present disclosure provides a method according to any of the twelfth to twentieth embodiments, wherein the article comprises at least one of a smartphone, a tablet computer, or an electronic display monitor.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Table 1 (below) lists materials used in the Examples.

TABLE 1

| DESIGNATION | DESCRIPTION/SOURCE |
|---|---|
| GlyFoma | glycerol formal methacrylate, mixture of isomers, obtained as VISIOMER GLYFOMA from Evonik, Essen, Germany |
| XT100 | MMA-butadiene-styrene (MBS) core-shell impact modifier obtained as CLEARSTRENGTH XT100 from Arkema, King of Prussia, Pennsylvania |
| DDMA | Methacrylate crosslinker obtained from methacrylate functionalization of 6000 molecular weight polyether (ethylene oxide/tetramethylene oxide 1/3-4) diol, as described in EP670341 obtained from 3M Company, St. Paul, Minnesota |
| methacrylic acid | obtained from Alfa Aesar, Ward Hill, Massachusetts |
| NK-Ester SA | β-acryloyl oxyethyl hydrogen succinate polymerizable monomer obtained as Kowa A-SA (NK-Ester) from Kowa America, New York, New York |
| HEMA | 2-hydroxyethyl methacrylate obtained from TCI America, Portland, Oregon |
| Cu(II)Naph | copper (II) naphthenate 77% in mineral spirits obtained in Strem Chemicals, Newbury, Massachusetts |
| ESS50F | Fibrillated high density polyethylene fibers obtained as SHORT STUFF ESS50F fibrillated HDPE from MiniFibers, Johnson City, Tennessee |
| TS 382 | fumed silica obtained as CAB-O-SIL TS 382 from Cabot Corporation, Boston, Massachusetts |
| BYK782 | combination of modified waxes obtained as BYK-S 782 from BYK USA, Wallingford, Connecticut |
| Benzoflex 9-88 | Benzoflex-9-88 Plasticizer obtained from Eastman Chemical Company, Kingsport, Tennessee |
| BTBAC | benzyltributylammonium chloride obtained from Alfa Aesar, Ward Hill, Massachusetts |
| TBEC | tert-butylperoxy 2-ethylhexyl carbonate obtained from Sigma-Aldrich, Milwaukee, Wisconsin |
| Genomer 5695 | acrylated oligoamine resin obtained as Genomer 5695 from Rahn USA, Hazlet, New Jersey |
| CHMA | cyclohexyl methacrylate obtained from Evonik |
| Sartomer SR340 | phenoxyethyl methacrylate obtained as Sartomer SR340 from Sartomer, Exton, Pennsylvania |
| HPMA | hydroxypropyl methacrylate obtained from Evonik |
| β-CEA | (β-carboxyethyl acrylate obtained from Allnex, Alpharetta, Georgia |
| Mcure 201 | aliphatic acrylate monomer obtained as MCURE 201 from Sartomer |
| HDK H18 | synthetic, hydrophobic, amorphous silica, produced via flame hydrolysis, obtained as HDK H18 Pyrogenic Silica from Wacker Chemie, Munich, Germany |

TABLE 1-continued

| DESIGNATION | DESCRIPTION/SOURCE |
|---|---|
| HC1101 | Branched poly(tetrahydrofuran) diamine with primary amine content of 7143 g/eq and total amine content of 5243 g/eq obtained from 3M Company as DYNAMAR HC-1101 |
| IEM | 2-isocyanatoethyl methacrylate obtained from Showa Denko K. K. Tokyo Japan under the trade designation of KARENZ MOI |
| MCHD | 2-methylcyclohexane-1,3-dione obtained from Alfa Aesar |
| 1,3-Dimethylurea | obtained from Alfa Aesar |
| Phenylmalonic acid | obtained from TCI America |
| Chloroform | obtained from EMD Millipore Corporation, Billerica, Massachusetts |
| Glacial acetic acid | obtained from EMD Millipore Corporation |
| Acetic anhydride | obtained from EMD Millipore Corporation |
| Trifluoroacetic acid | obtained from Alfa Aesar |
| Dichloromethane | obtained from EMD Millipore Corporation |
| POCl$_3$ | Phosphorus (V) oxychloride, obtained from Alfa Aesar, Ward Hill, MA |
| Benzyl tri-n-butylammonium chloride | obtained from Alfa Aesar |
| 2-Nitrobenzyl alcohol | obtained from Alfa Aesar |
| Camphorsulfonic acid | 10-camphorsulfonic acid, obtained from Millipore Sigma, Saint Louis, Missouri |
| Toluene | obtained from EMD Millipore Corporation |

Synthesis of 1,3-dimethyl-5-phenylbarbituric acid (PhDMBA)

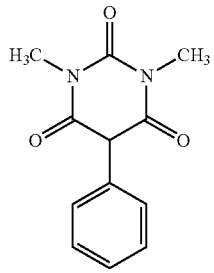 [SMILES: CN1C(=O)C(c2ccccc2)C(=O)N(C)C1=O]

To a solution of 1,3-dimethylurea (2.66 grams, 30.0 mmol) and phenylmalonic acid (5.40 grams, 30.0 mmol) in chloroform (70 mL) was added glacial acetic acid (5.5 mL, 96.0 mmol). The resultant reaction mixture was heated at 50° C. Acetic anhydride (11.3 mL, 120.0 mmol) and trifluoroacetic acid (0.5 mL, 6.6 mmol) were added, and the reaction mixture was then heated at reflux while stirring overnight. The following morning, the volatile components were removed under reduced pressure, and the residue was added to water (100 mL). After stirring for 2 hours, the formed solid was collected via filtration and washed with additional water. The solid was then dissolved in dichloromethane and washed with saturated aqueous sodium chloride. The organic layer was dried over anhydrous magnesium sulfate, filtered, and concentrated to afford 1,3-dimethyl-5-phenylbarbituric acid (4.20 grams, 60% yield) as a white solid.

Synthesis of Nitrobenzyl-blocked 5-phenyl-1,3-dimethylbarbituric acid (b-PhDMBA)

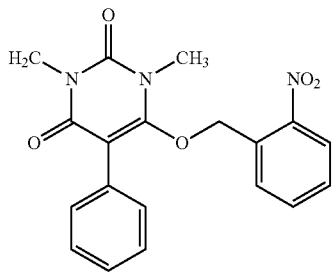 [SMILES: Cn1c(OCc2ccccc2[N+](=O)[O-])c(-c2ccccc2)c(=O)n(C)c1=O]

Step one: 1,3-Dimethyl-5-phenylbarbituric acid (4.20 grams, 18.08 mmol) was dissolved in POCl$_3$ (30 mL). Water (1.0 mL) was added dropwise to the mixture, resulting in a significant exotherm. Once the exotherm had subsided, the mixture was heated at reflux for 4 hours. The majority of the POCl$_3$ was then removed under reduced pressure, and cold water was added to the residue. The mixture was extracted with dichloromethane (3×75 mL). The combined organic layers were washed sequentially with saturated aqueous sodium bicarbonate, water, and saturated aqueous sodium chloride, then dried over anhydrous magnesium sulfate, filtered, and concentrated to provide an orange oil. Purification of this material via suction filter column (SiO$_2$, 3:1 hexane:ethyl acetate eluent) afforded 1,3-dimethyl-5-phenyl-6-chlorouracil (4.30 grams, 95% yield) as a white solid.

Step two: Benzyl tri-n-butylammonium chloride (0.54 grams, 1.7 mmol) and 2-nitrobenzyl alcohol (3.94 grams, 25.7 mmol) were added to a solution of sodium hydroxide (3.43 grams, 85.8 mmol) in water (80 mL). A solution of the 1,3-dimethyl-5-phenyl-6-chlorouracil (4.30 grams, 17.15 mmol) in dichloromethane (50 mL) was then added. The resultant biphasic mixture was stirred vigorously overnight at room temperature. The following morning, the aqueous layer was adjusted to a pH of about 6, then extracted with dichloromethane (3×75 mL). The combined organic layers were then washed sequentially with water and saturated aqueous sodium chloride, then dried over anhydrous magnesium sulfate, filtered, and concentrated to an orange oil. Purification of this material via suction filter column (SiO$_2$, 1:1 hexane:ethyl acetate eluent) affords the product (3.14 grams, 50% yield) as a white solid.

Synthesis of Nitrobenzyl-blocked 2-methylcyclohexyl-1,3-dione (b-MCHD)

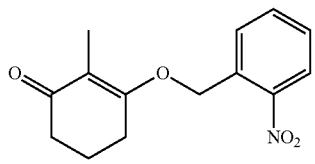 [SMILES: CC1=C(OCc2ccccc2[N+](=O)[O-])CCCC1=O]

A 500-mL round bottomed flask was charged with 2-nitrobenzyl alcohol (30.62 grams, 200 mmol), 2-methylcyclohexane-1,3-dione (MCHD) (27.76 grams, 220 mmol), camphorsulfonic acid (2.32 grams, 10.0 mmol), and toluene (200 mL). The flask was equipped with a magnetic stirbar and Dean-Starke trap and heated at reflux. After heating overnight (21 hours), the toluene was removed under reduced pressure, and saturated aqueous sodium bicarbonate (400 mL) was added to the residue. After stirring vigorously for several hours, the solids were collected via filtration, washing with additional H$_2$O. This provides 45.7 grams of crude product. Toluene (150 mL) was added to the crude product, and the resultant mixture was heated at reflux. After the mixture became essentially homogeneous, the heat was removed and the solution was allowed to cool overnight. The resultant precipitate was collected via filtration, washing with a very small amount of additional toluene. This provides 32.8 grams of b-MCHD as a light tan solid (63% yield).

Synthesis of HC1101/IEM

HC1101 (200 g) was melted at 150 F and weighed into a Max 200 DAC Speedmixer cup (FlackTek Inc., Landrum, South Carolina). To this, isocyanatoethyl methacrylate (IEM, 6.2 g) was added. The components were mixed in a DAC Speedmixer (FlackTek Inc.) at 1500 rpm for 2 minutes. The homogeneous blend became warm and was allowed to react for at 24 hr before use. If solidified, the HC1101/IEM was remelted at 150° C. prior to use.

Overlap Shear Testing Procedure

Aluminum substrates (1 inch×4 inches×0.064 inch, (2.5 cm×10 cm×0.16 cm)) to be testing were washed with methyl ethyl ketone, air dried for 10 minutes, then grit-blasted using alumina grit. Photoactivatable adhesive precursor composition was stencil-printed onto the aluminum substrate in a 0.5 inch×1 inch (1.3 cm×2.5 cm) area on the grit-blasted portion of the substrate. The substrate was exposed to actinic electromagnetic radiation from a Heraeus/Fusion UV Systems (Gaithersburg, Maryland) Light Hammer 10 Mark II microwave UV system equipped with a D-type bulb. Glass bead spacers were added to the photoactivatable adhesive precursor composition. A second aluminum substrate was applied to the irradiated sample, thus closing the bond (bond area=0.5 inch×1 inch (1.3 cm×2.5 cm)). The bond was clamped with binder clips and allowed to sit at room temperature for 18-24 hr prior to testing. Dynamic overlap shear testing was performed at ambient temperature using an MTS Sintech Tensile Tester, specimens were loaded into the grips and the crosshead was operated at 0.2 inch per minute (0.5 cm/min), loading the specimen to failure. Stress at break was recorded in units of pounds per square inch (psi).

Example 1

The examples below consist of a 10:1 mixture of a base resin and an accelerator formulation. The base resin includes a (meth)acrylic monomer, a transition metal salt, and an ammonium halide salt. The base resins were prepared by adding all components into a DAC mixing cup and mixing under reduced pressure until homogeneous in amounts as shown in Table 2 (below).

TABLE 2

| BASE FORMULATION | |
|---|---|
| COMPONENT | AMOUNT, grams |
| GlyFoma | 39 |
| XT100 | 21 |
| Methacrylic acid | 15.0 |

TABLE 2-continued

BASE FORMULATION

| COMPONENT | AMOUNT, grams |
|---|---|
| NK-Ester SA | 7.5 |
| HEMA | 3.98 |
| BTBAC | 0.12 |
| Cu(II)Naph | 0.23 |
| ESS50F | 2.6 |
| TS 382 | 6.9 |
| BYK-782 | 3.4 |
| DDMA | 75 |

The accelerator formulation contains the photoactivatable reducing agent and the peroxide. The accelerator formulations were prepared by adding all components as reported in Table 3 (below) into a DAC mixing cup and mixing under reduced pressure until homogeneous.

TABLE 3

ACCELERATOR FORMULATION

| COMPONENT | AMOUNT, grams |
|---|---|
| Benzoflex-988 | 13.5 |
| XT100 | 4.5 |
| b-PhDMBA | 1.0 |
| TBEC | 1.0 |
| Genomer 5695 | 1.0 |

The base and accelerator formulations were loaded into a 10:1 dispenser, respectively, and then dispensed onto a stencil, effectively mixing the two parts. According to the Overlap Shear Testing Procedure the mixture was stencil-printed onto aluminum substrates. After printing through the stencil onto aluminum substrates, half of the samples were exposed to irradiation (light), half were not (dark). To mimic an assembly line, after printing the photoactivatable adhesive composition on aluminum substrates, the samples were exposed to ambient conditions for 8-10 min, and then irradiated (1.5 J). All bonds were closed immediately following irradiation. Results are reported in Table 4 (below).

TABLE 4

| SPECIMEN | Overlap Shear Strength, psi | |
|---|---|---|
| | light | dark |
| 1 | 497.6 | 1.3 |
| 2 | 564.8 | 2.7 |
| 3 | 501.2 | 1.0 |
| average | 521.2 | 1.7 |
| St. Dev. | 30.9 | 0.7 |

The failure mode for each adhesive was cohesive. The average break stress was significantly different between irradiated (light) and non-irradiated (dark) samples.

Example 2

In the following examples, the base and accelerator formulations were loaded into a DAC mixing cup in a 10:1 wt.:wt. ratio, respectively, mixed under reduced pressure until homogeneous and then dispensed onto a stencil. The base resin and accelerator formulation are reported in Tables 5 and 6, respectively. Overlap Shear test results are reported in Table 7.

TABLE 5

BASE FORMULATION

| COMPONENT | AMOUNT, grams |
|---|---|
| CHMA | 13.15 |
| Sartomer SR340 | 13.15 |
| HPMA | 13.33 |
| HEMA | 2.38 |
| XT100 | 11.25 |
| HC1101/IEM | 45 |
| methacrylic acid | 10 |
| NK-Ester SA | 10 |
| BTBAC | 0.12 |
| Cu(II)Naph | 0.20 |
| ESS50F | 1.7 |
| BYK 782 | 1.5 |

TABLE 6

ACCELERATOR FORMULATION

| COMPONENT | AMOUNT, grams |
|---|---|
| Benzoflex-988 | 13.5 |
| XT100 | 4.5 |
| b-PhDMBA | 1.0 |
| TBEC | 1.0 |
| Genomer 5695 | 1.0 |

TABLE 7

| SPECIMEN | Overlap Shear Strength, psi | |
|---|---|---|
| | light | dark |
| 1 | 400.4 | 74.4 |
| 2 | 476.6 | 69.2 |
| 3 | 374.7 | 98.3 |
| average | 417.2 | 80.6 |
| St. Dev. | 43.3 | 12.7 |

Example 3

Example 2 was repeated, except that the base resin and accelerator formulation were modified as reported in Tables 8 and 9, respectively. Overlap Shear test results are reported in Table 10.

TABLE 8

BASE FORMULATION

| COMPONENT | AMOUNT, grams |
|---|---|
| GlyFoma | 39 |
| XT100 | 21 |
| Methacrylic acid | 15.0 |
| NK-Ester SA | 7.5 |
| HEMA | 3.98 |
| BTBAC | 0.12 |
| Cu(II)Naph | 0.23 |
| ESS50F | 2.6 |
| TS 382 | 6.9 |
| BYK-782 | 3.4 |
| DDMA | 75 |

TABLE 9

ACCELERATOR FORMULATION

| COMPONENT | AMOUNT, grams |
|---|---|
| Benzoflex-988 | 13.5 |
| XT100 | 4.5 |
| b-MCHD | 1.0 |
| TBEC | 1.0 |
| Genomer 5695 | 1.0 |

TABLE 10

| | Overlap Shear Strength, psi | |
|---|---|---|
| SPECIMEN | light | dark |
| 1 | 398.0 | 0.4 |
| 2 | 295.7 | 10.8 |
| 3 | 286.2 | 38.5 |
| average | 326.6 | 16.6 |
| St. Dev. | 50.6 | 16.1 |

Comparative Example A

Example 2 was repeated, except that the base resin and accelerator formulation were modified as reported in Tables 11 and 12, respectively and no Overlap Shear Test was performed as the combined mixture cured too rapidly to permit stencil printing.

TABLE 11

BASE FORMULATION

| COMPONENT | AMOUNT, grams |
|---|---|
| GlyFoma | 39 |
| XT100 | 21 |
| Methacrylic acid | 15.0 |
| NK-Ester SA | 7.5 |
| HEMA | 3.98 |
| BTBAC | 0.12 |
| Cu(II)Naph | 0.23 |
| ESS50F | 2.6 |
| TS 382 | 6.9 |
| BYK-782 | 3.4 |
| DDMA | 75 |

TABLE 12

ACCELERATOR FORMULATION

| COMPONENT | AMOUNT, grams |
|---|---|
| Benzoflex-988 | 13.5 |
| XT100 | 4.5 |
| PhDMBA | 1.0 |
| TBEC | 1.0 |
| Genomer 5695 | 1.0 |

Comparative Example B

Example 2 was repeated, except that the base resin and accelerator formulation were modified as reported in Tables 13 and 14, respectively, and no Overlap Shear Test was performed as the combined mixture cured too rapidly to permit stencil printing.

TABLE 13

BASE FORMULATION

| COMPONENT | AMOUNT, grams |
|---|---|
| GlyFoma | 39 |
| XT100 | 21 |
| Methacrylic acid | 15.0 |
| NK-Ester SA | 7.5 |
| HEMA | 3.98 |
| BTBAC | 0.12 |
| Cu(II)Naph | 0.23 |
| ESS50F | 2.6 |
| TS 382 | 6.9 |
| BYK-782 | 3.4 |
| DDMA | 75 |

TABLE 14

ACCELERATOR FORMULATION

| COMPONENT | AMOUNT, grams |
|---|---|
| Benzoflex-988 | 13.5 |
| XT100 | 4.5 |
| MCHD | 1.0 |
| TBEC | 1.0 |
| Genomer 5695 | 1.0 |

All cited references, patents, and patent applications in this application that are incorporated by reference, are incorporated in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of disposing an adhesive composition onto a first surface of a first substrate, the method comprising steps:
    a) disposing a photoactivatable adhesive precursor composition onto a portion of the first surface of the first substrate according to a predetermined pattern, wherein the photoactivatable adhesive precursor composition comprises:
        at least one free-radically polymerizable compound; and
        a photoactivatable redox initiation system comprising:
            (i) at least one photoactivatable reducing agent precursor;
            (ii) at least one transition metal compound comprising at least one metal selected from groups 5 to 11 in the Periodic Table of the Elements; and
    b) exposing the photoactivatable adhesive precursor composition to actinic electromagnetic radiation, thereby providing an adhesive precursor composition that spontaneously cures to provide the adhesive composition,
    wherein the at least one photoactivatable reducing agent precursor is represented by:

wherein $$\text{R}^{Photo}-O-\underset{R^3}{\overset{R^2}{\underset{|}{\underset{N}{\bigvee}}}}\overset{O}{\underset{O}{\bigvee}}N-R^1$$

each $R^1$, $R^2$, and $R^3$ independently represents H or a hydrocarbyl group having from 1 to 18 carbon atoms; and each $R^{Photo}$ independently represents a photoremovable group.

2. The method of claim 1, wherein the at least one metal selected from groups 5 to 11 in the Periodic Table of the Elements comprises at least one of copper, iron, ruthenium, chromium, molybdenum, palladium, nickel, platinum, manganese, rhodium, rhenium, cobalt, vanadium, gold, niobium, or silver.

3. The method of claim 1, wherein the at least one free-radically polymerizable compound comprises at least one (meth)acrylic monomer or oligomer.

4. The method of claim 1, wherein the photoremovable group is an o-nitrobenzyl group.

5. The method of claim 1, further comprising organic peroxide.

6. A method of disposing an adhesive composition onto a first surface of a first substrate, the method comprising steps:
a) disposing a photoactivatable adhesive precursor composition onto a portion of the first surface of the first substrate according to a predetermined pattern, wherein the photoactivatable adhesive precursor composition comprises:
at least one free-radically polymerizable compound; and
a photoactivatable redox initiation system comprising:
(i) at least one photoactivatable reducing agent precursor;
(ii) at least one transition metal compound comprising at least one metal selected from groups 5 to 11 in the Periodic Table of the Elements; and
(iii) quaternary ammonium halide; and
b) exposing the photoactivatable adhesive precursor composition to actinic electromagnetic radiation, thereby providing an adhesive precursor composition that spontaneously cures to provide the adhesive composition.

7. The method of claim 1, wherein said disposing the photoactivatable adhesive precursor composition comprises screen printing or stencil printing the photoactivatable adhesive precursor composition.

8. The method of claim 1, further comprising contacting the adhesive precursor composition with at least a portion of a second surface of a second substrate prior to sufficient curing to provide the adhesive composition.

9. An article comprising:
a first surface of a first substrate adhered to a second surface of a second substrate by an adhesive layer having a predetermined pattern that contacts less than the entire first surface, wherein the adhesive layer comprises an adhesive composition preparable by exposing a photoactivatable adhesive precursor composition to actinic electromagnetic radiation, thereby providing an adhesive precursor composition that spontaneously cures to provide the adhesive composition, and wherein the photoactivatable adhesive precursor composition comprises:
at least one free-radically polymerizable compound; and
a photoactivatable redox initiation system comprising:
(i) at least one photoactivatable reducing agent precursor; and
(ii) at least one transition metal compound comprising at least one metal selected from groups 5 to 11 in the Periodic Table of the Elements,
wherein the at least one photoactivatable reducing agent precursor is represented by:
wherein $$\text{R}^{Photo}-O-\underset{R^3}{\overset{R^2}{\underset{|}{\underset{N}{\bigvee}}}}\overset{O}{\underset{O}{\bigvee}}N-R^1$$

each $R^1$, $R^2$, and $R^3$ independently represents H or a hydrocarbyl group having from 1 to 18 carbon atoms; and each $R^{Photo}$ independently represents a photoremovable group.

10. The article of claim 9, wherein the at least one metal selected from groups 5 to 11 in the Periodic Table of the Elements comprises at least one of copper, iron, ruthenium, chromium, molybdenum, palladium, nickel, platinum, manganese, rhodium, rhenium, cobalt, vanadium, gold, niobium, or silver.

11. The article of claim 9, wherein the at least one free-radically polymerizable compound comprises at least one (meth)acrylic monomer or oligomer.

12. The article of claim 9, wherein the photoremovable group is an o-nitrobenzyl group.

13. The article of claim 9, further comprising organic peroxide.

14. An article comprising:
a first surface of a first substrate adhered to a second surface of a second substrate by an adhesive layer having a predetermined pattern that contacts less than the entire first surface, wherein the adhesive layer comprises an adhesive composition preparable by exposing a photoactivatable adhesive precursor composition to actinic electromagnetic radiation, thereby providing an adhesive precursor composition that spontaneously cures to provide the adhesive composition, and wherein the photoactivatable adhesive precursor composition comprises:
at least one free-radically polymerizable compound; and
a photoactivatable redox initiation system comprising:
(i) at least one photoactivatable reducing agent precursor;
(ii) at least one transition metal compound comprising at least one metal selected from groups 5 to 11 in the Periodic Table of the Elements; and
iii) quaternary ammonium halide.

15. The article of claim 9, wherein the article comprises at least one of a smartphone, a tablet computer, or an electronic display monitor.

16. The article of claim 14, wherein the article comprises at least one of a smartphone, a tablet computer, or an electronic display monitor.

\* \* \* \* \*